United States Patent [19]

Adriaenssens et al.

[11] Patent Number: 4,871,997

[45] Date of Patent: Oct. 3, 1989

[54] PROXIMITY SENSOR APPARATUS

[75] Inventors: Luc W. Adriaenssens, Berkeley, Calif.; Orlando A. Bustos, Dayton; David Swanson, Moraine, both of Ohio

[73] Assignee: Tech-Age International Corporation, Dayton, Ohio

[21] Appl. No.: 68,173

[22] Filed: Jun. 30, 1987

[51] Int. Cl.[4] .......................... G08B 1/08; H04Q 7/00

[52] U.S. Cl. .................................... 340/539; 340/531; 455/9; 455/229

[58] Field of Search ................ 340/539, 531; 455/229, 455/9

[56] References Cited

U.S. PATENT DOCUMENTS

| | | | |
|---|---|---|---|
| 3,833,895 | 9/1974 | Fecteau | 340/539 |
| 4,148,020 | 4/1979 | Siemer et al. | 340/539 |
| 4,232,308 | 11/1980 | Lee et al. | 340/539 |
| 4,260,982 | 4/1981 | DeBenedictis et al. | 340/539 |

*Primary Examiner*—Donnie L. Crosland
*Attorney, Agent, or Firm*—Biebel, French & Nauman

[57] ABSTRACT

A radio frequency proximity sensing apparatus includes a transmitter having an oscillator circuit for propagating a pulsed RF signal and a receiver having a sensor circuit for the detection of the propagated pulsed RF signal. The receiver includes a logic circuit for processing the propagated pulsed RF signal and a plurality of 14-bit oscillator/resistor timers. An alarm in the receiver is controlled by first and second oscillating circuits such that the transmitter and receiver act in unison to actuate the alarm as the receiver and the transmitter are separated by a distance exceeding the effective RF signal range of the transmitter.

16 Claims, 7 Drawing Sheets

RECEIVER (PRELIMINARY)

PROXIMITY SENSOR APPARATUS

BACKGROUND TO THE INVENTION

Credit cards, identification cards, security system cards, and the like are thin, small objects that are easily misplaced, lost, or stolen. With the advent of integrated circuits, even calculators, some of which have scientific applications, are quite thin and fit into a wallet or purse.

These credit cards, security system cards, or other devices are becoming smaller, thinner, and more common. They represent either money spent by the holder for these devices or, quite often, as in the case of credit cards, money that may be spent by the holder. All of these devices are valuable to one degree or another and can create problems for the holder if they are lost or stolen.

The present device relates to radio frequency proximity sensor apparatus and, in particular, relates to credit-card sized, radio frequency proximity sensor apparatus, such that the device may be conveniently carried in a wallet or purse. One part of the device is carried in the wallet or purse, or item to be protected; and the other part of the device is carried, for example, on a belt such that if the wallet or purse is moved away from the party using the inventive apparatus, an alarm will sound.

The device is adaptable to a wide variety of sensor proximity applications, such as wherein the receiver component of the device is attached to portable stereos, coats, briefcases, and luggage for the protection and the securement of same.

DESCRIPTION OF THE PRIOR ART

Various security devices are known to alert a user if a wallet or purse has been left unattended for a given period of time. Likewise, some devices employ a system of switches such that if a credit card is taken, an alarm sounds if the card is not returned after an elapsed time. The following cited references are found to be exemplary of the U.S. prior art.

| U.S. Pat. No. | Inventor |
|---|---|
| 3,930,249 | Steck, et al |
| 3,959,789 | McGahee |
| 4,480,250 | McNeely |

U.S. Pat. No. 3,930,249 to Steck, et al discloses a wallet or the such having incorporated therewith an electronic circuit capable of emitting an audible alarm when the same is removed from an owner's purse or pocket.

U.S. Pat. No. 3,959,789 to McGahee discloses a check or credit card monitor, consisting of a plurality of normally closed switches adapted to be held open by insertion of credit card or similar items between the switch contacts.

U.S. Pat. No. 4,480,250 to McNeely discloses a credit card carrier, includign a pair of flaps foldable upon each other. Each of the flaps carries clip switches adapted for receiving credit cards therein.

SUMMARY OF THE INVENTION

The present apparatus relates to devices for the protection of property, such as luggage, portable stereos, coats, briefcases, and wallets and specifically relates to those proximity sensor devices constructed of lightweight, durable materials that fit within purses, wallets, or pockets.

In particular, the present device relates to a matched or paired transmitter and receiver such that as the receiver is attached to an article to be protected, an alarm therein sounds when the article is taken out of transmitter range.

A primary objective of the device is to alert a user when the wearer moves a critical distance away from a wallet or purse, such alert being in the form of an audible alarm. Thus the device is to be used to aid in keeping track of such items as wallets and purses in the event they are forgotten or stolen from an individual as by pickpockets.

Another primary object of the device is to provide a construction such that the objectives of the invention reside in an apparatus that is reliable, having features thereof materially adding to the convenience of use and utility of construction.

Another object of the device is to provide a truly active system in that no specific environmental condition or action need take place for the apparatus to become active. This, for example, can be illustrated by a purse snatcher taking a whole purse. Conventionally, most such devices would not activate, because the device is wholly contained in the purse. A true, active system, however, alerts as the purse or wallet moves past the critical distance from the user; i.e., from the person.

Another object of the present apparatus is to provide built-in logic functions such that the device will function to reset an alarm mechanism, to actuate an alarm device, or to turn off an alarm mechanism as controlled by the logic of the device.

Another object of the device is to provide a coherent, predetermined set of audible signals, feedback signals, to the user such that the device keeps the user informed of such system status checks as low battery voltage conditions, indicatated by three short beeps. One beep indicating device enable, two indicating device disable.

A still further object of the device is to provide true portability such that it can be inserted into any conventional wallet or purse—the device being thin enough so that it can fit into a pocket or clip onto a belt, and preferably, the transmitter component of the device molded into a clip such that it may easily be affixed to a pocket, belt, or keychain.

A further object is to provide a variety of features, such as a time-out feature and an automatic reset between a transmitter and a mated-or frequency-paired receiver that act in unison to achieve the objects of the invention.

A still further object of the invention is to provide a timedelay mechanism such that the length of the delay equates directly to the functional response of the receiver/alarm.

Still another further object of the invention is to provide a device of such construction that all functions are controlable through the transmitter component and further that both the on-off function and rest function are provided for in a single switch.

DESCRIPTION OF THE PREFERRED EMBODIMENT

Figure 1:
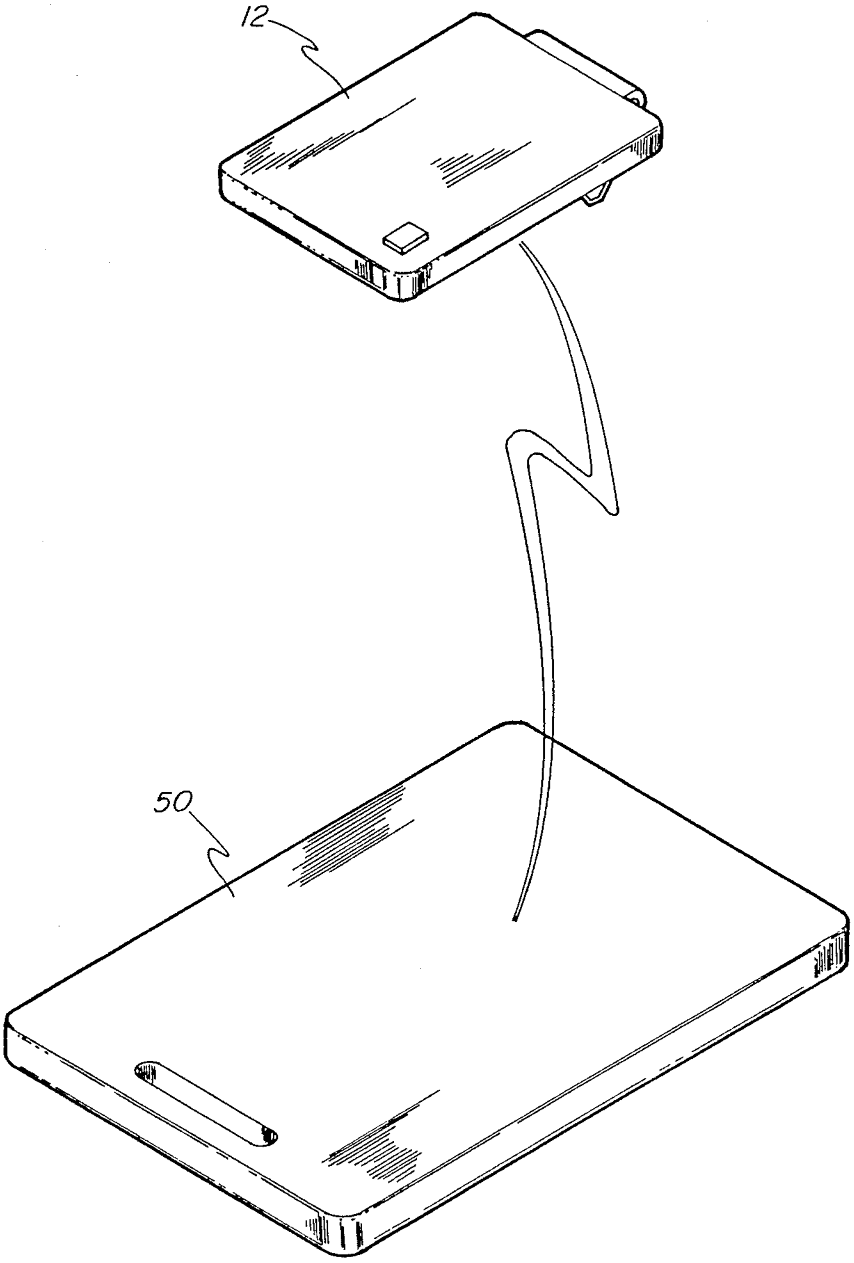
FIG. 1 is a perspective view, illustrating the device consisting of two basic components: a transmitter encased container substantially ⅓ the size of a credit-card, and a receiver likewise encased in a credit-card sized enclosure.
Figure 2:
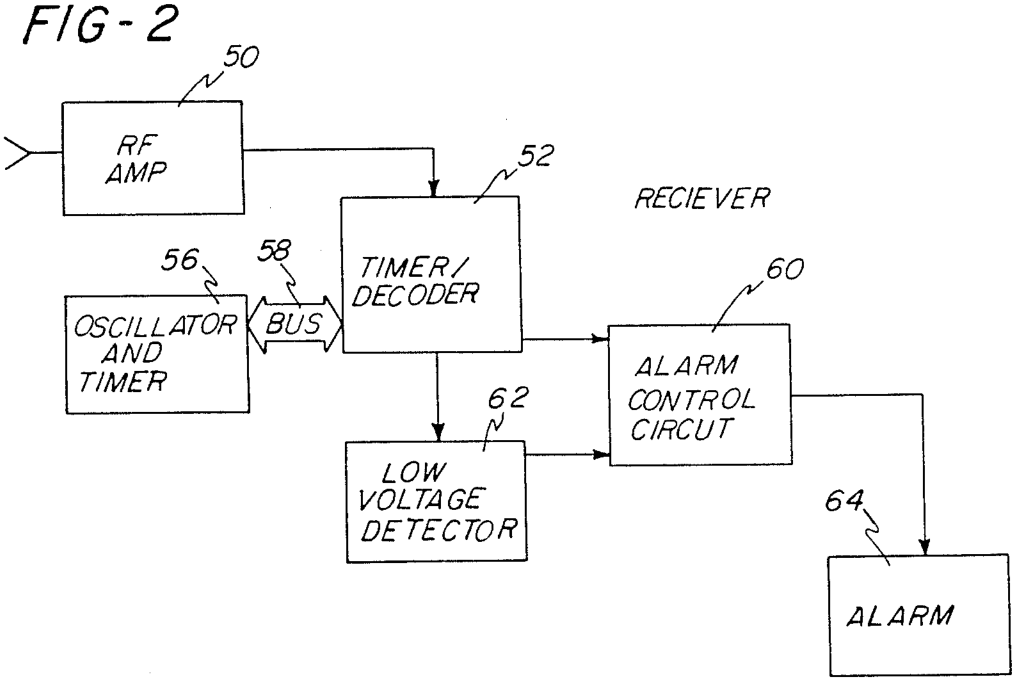
FIG. 2 is a block diagram, illustrating a functional connection between the various receiver components.
Figure 3:
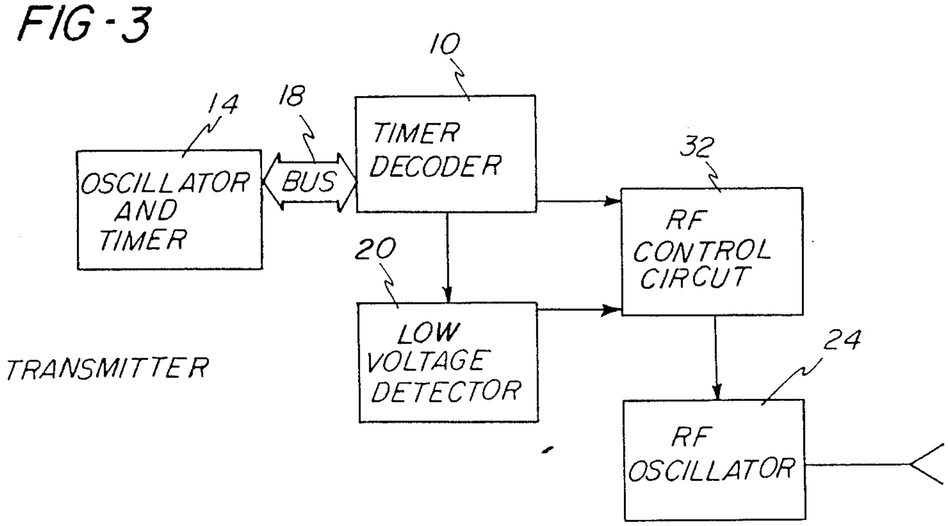
FIG. 3 is a block diagram, showing schematically the functional relationships of the components of the transmitter.

Referring now to the drawings, FIGS. 1 through 6, the invention includes a transmitter housing 12, containing electronic means for the propagation of a pulsed RF electromagnetic signal and which cooperates with a receiver housing 50 having means for the detection and reception of a pulse RF electromagnetic signal as will be described hereinafter.

Any well-known electronic means can be used to implement the specific electronic functions as are referenced herein, such as:

(a) semicustom semiconductors;

(b) combination of standard semiconductors; or (c) custom semiconductors.

The manufacturing technology selected will be understood to be consistent with the number of unique frequency combinations that are desired, to ensure that a discrete frequency is provided for each of a plurality of systems as produced according to the invention.

In FIGS. 1 through 5, the component 12 represents a transmitter sending a signal to a receiver 50, the transmitter being approximately ⅓ the size of a credit card.

In receiver 50, an RF amplifier circuit 52 detects a signal from transmitter 12 and transfers that signal through timer/decoder 54 and through oscillator and timer 56 via bus 58. As the signal is processed, the timer/decoder circuit 54 generates a signal, in the first instance, if and only if no pulsed signal is received in a unit duration of time; if no signal from component 12 is detected by the receiver 50, the logic of the device causes an internal signal to be generated, as indicated, and thereby actuates alarm control circuit 60.

Figure 4:
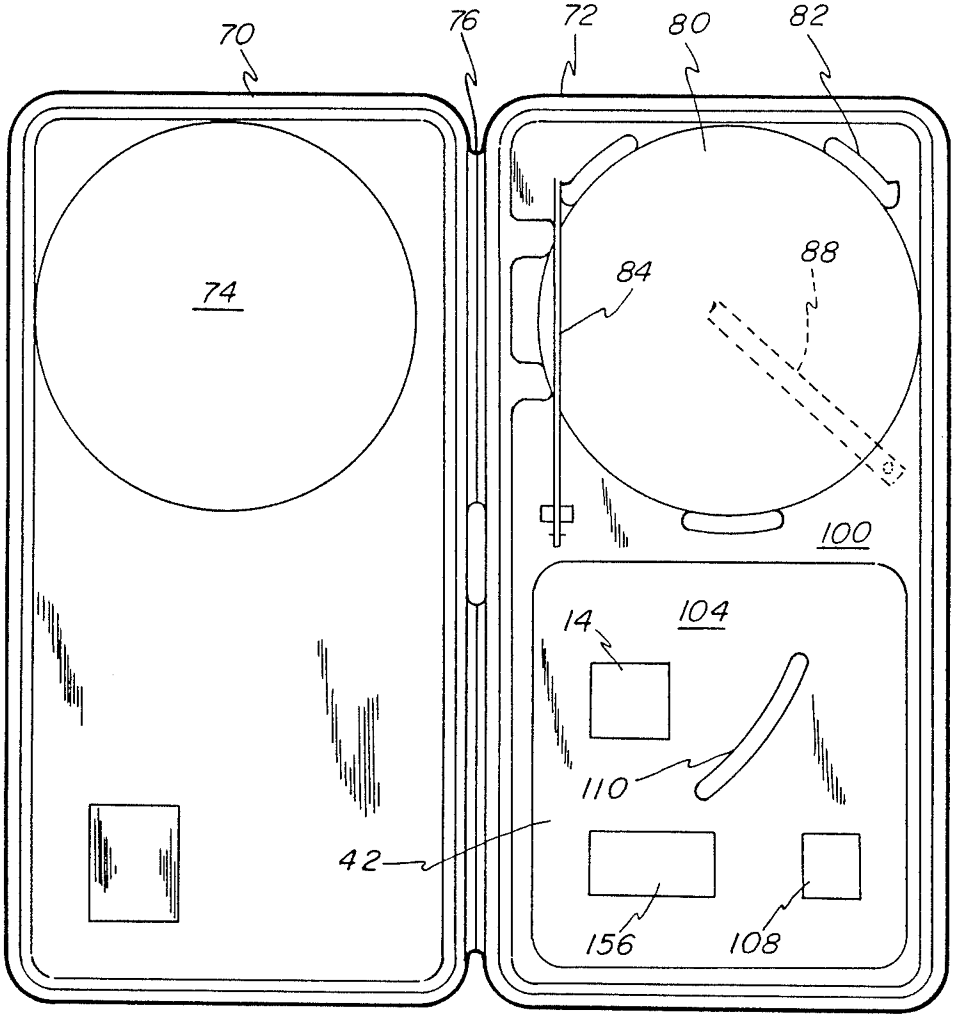
FIG. 4 is a plan view, illustrating the opened, hinged case components of the transmitter element.
Figure 5:
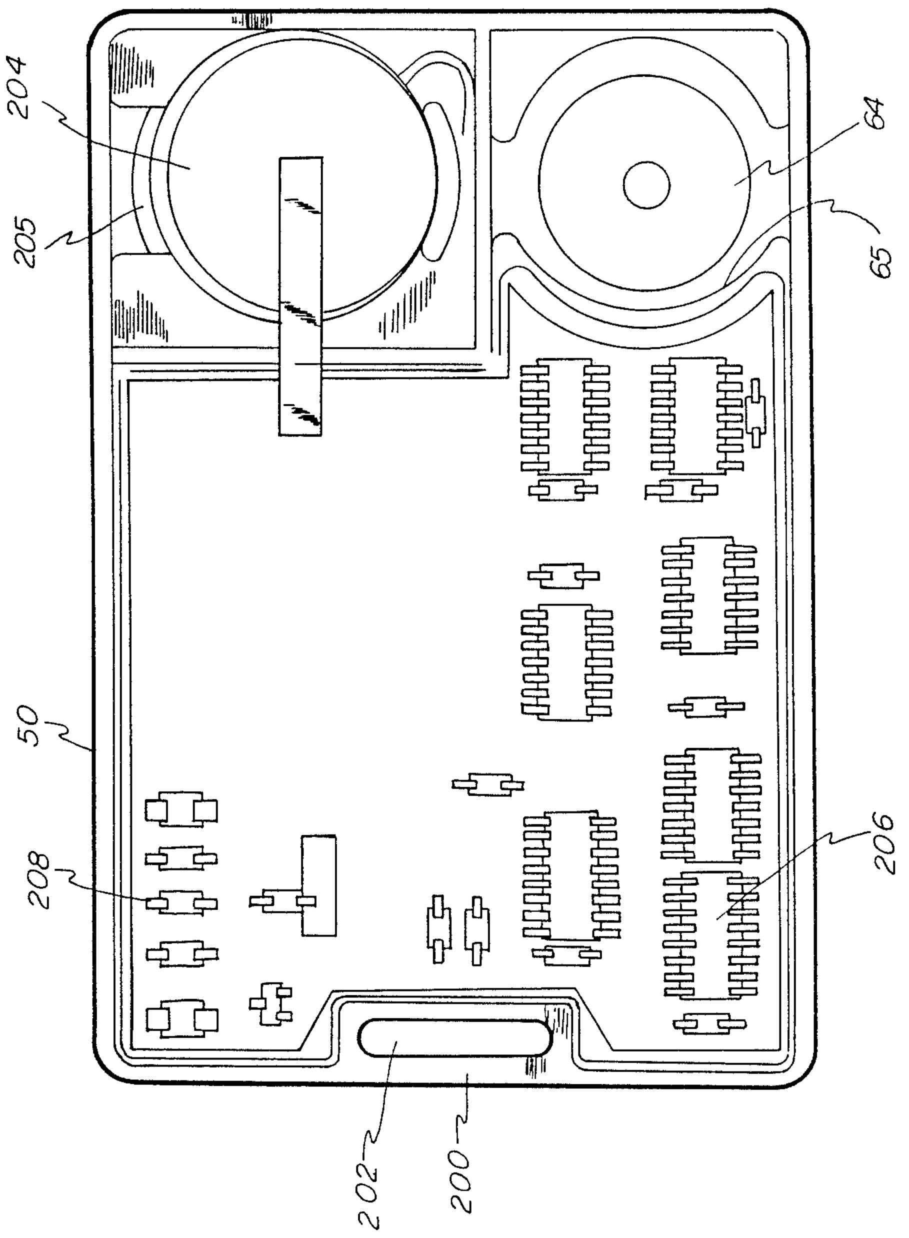
FIG. 5 is an enlarged plan view of the major electronic components of the receiver.
Figure 6:
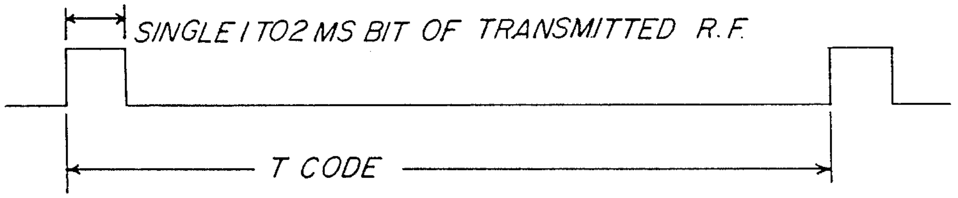
FIG. 6 is a simplified schematic of a typical transmitter signal, indicating both a pulsed signal and a null or blank timed carrier signal.
Figure 7:
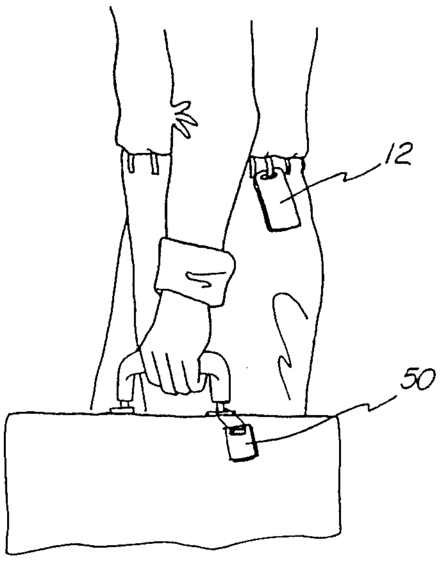
FIG. 7 illustrates a typical manner of employment of the invention.
Figure 8:
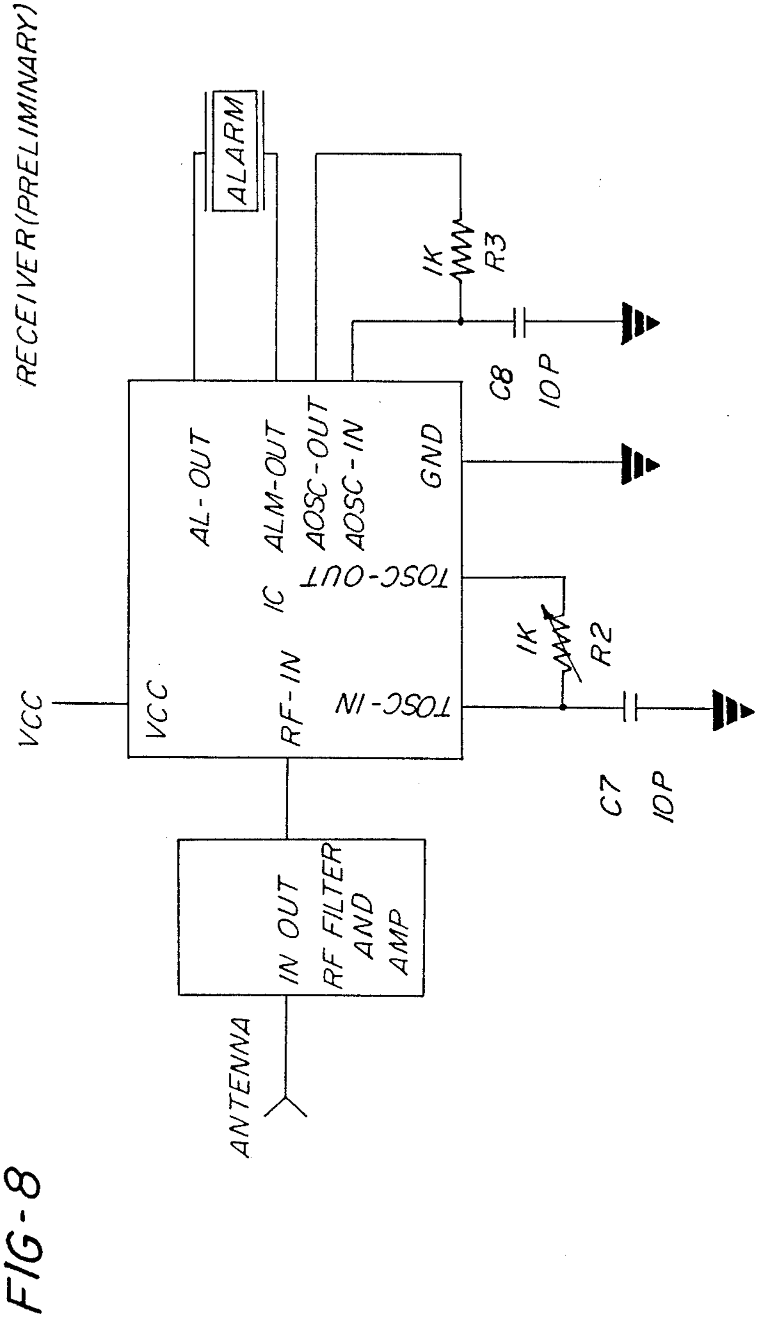
FIGS. 8 and 9 are schematic diagrams illustrative of a typical electronic layout for the device.
Figure 9:
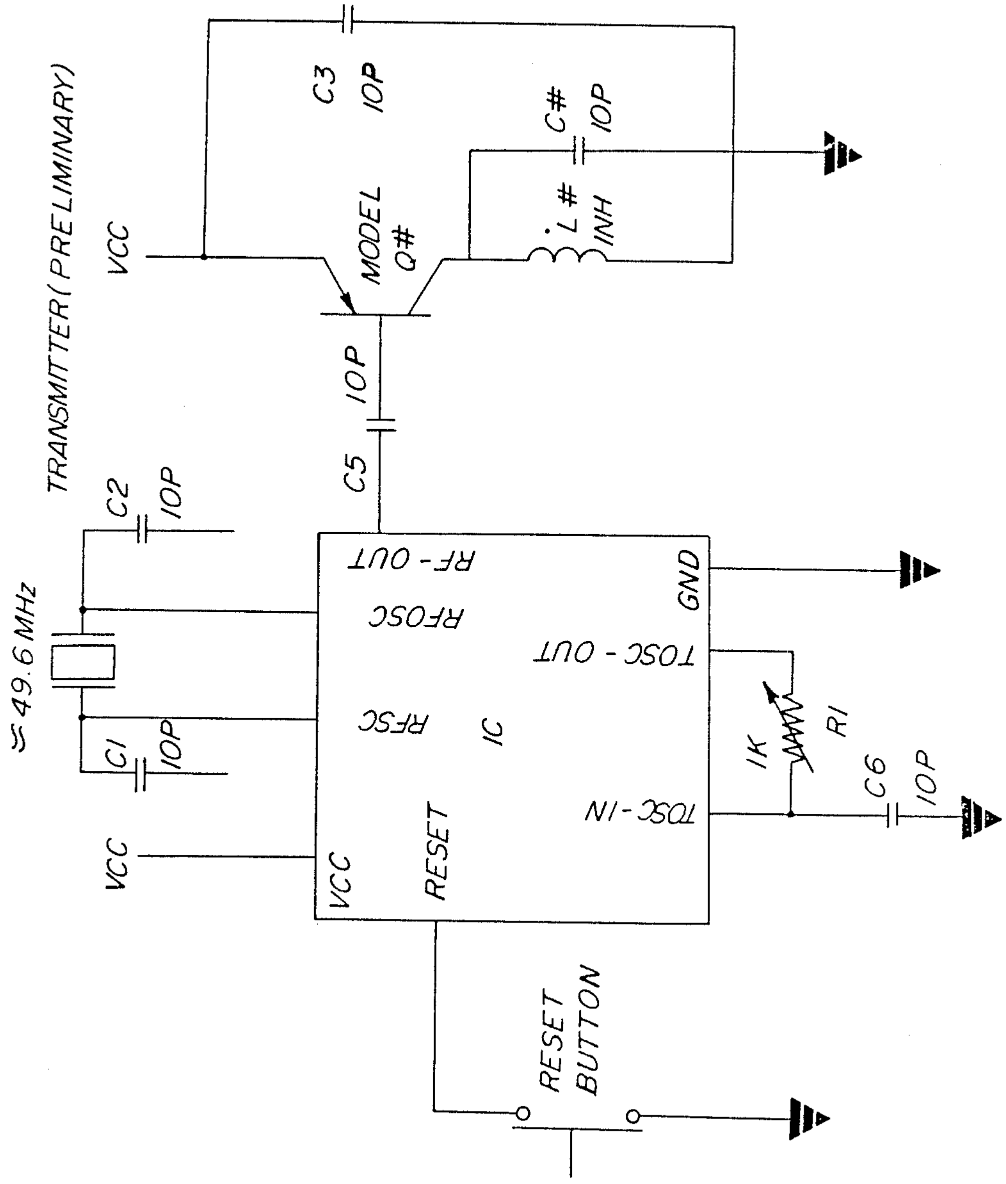

The transmitter 12 having an oscillator and timer means 14, joined to a timer decoder circuit 16 by the bus 18, a low-voltage detector circuit 20, RF control circuit 22, and RF oscillating means 24. These circuits are contained in a housing 12, consisting of an upper case 70 and lower case 72, as shown in FIG. 4. Hinge means 76 allows both cases to fold one onto another such that the circuitry may be thereby enclosed. The upper case 70 includes a recessed area 74 to allow a battery 80 to fit within the case as it is closed.

The lower case 72 includes fastening means 82 for releasably securing a suitable power cell, such as a lithium battery 80 which engages a negative terminal 88 and a positive terminal 84 to provide electrical means for an adjacent circuit board 104. This cirucit board 104 includes a switch 108 and resonating means 14, capacitor and resistor circuits as hereinafter described, and a transistor or custom integrated circuit (IC) 106.

The cooperating receiver 50 is provided with a lithium battery 204 inserted into a case 200 by securing means 205, such as snaps , providing electrical means for the receiver circuitry consisting, as indicated, of an RF amplifier circuit and the various logic functions that act on the pulsed, timed transmitter signal as generated by the separate component 12.

The transmitter housing 12, in the preferred embodiment, contains oscillating means 14, such as a Colpitts oscillator, which emits an electromagnetic field of a specific frequency as, for example, determined by a ceramic resonator. As the ceramic resonator is changed, it changes the frequency at which transmitter 12 transmits.

Colpitts oscillator 14 is used herein as an example of oscillating means, which alternatively can take the form of an inductor-capacitor oscillator, resistor-capacitor oscillator, or crystal-driven oscillator.

In the present, preferred embodiment, the Colpitts oscillator 14 is controlled by a 14-bit, binary counter, that contains a resistor-capacitor network 106, whereby another oscillating circuit is established. Circuit 106 constitutes a counter oscillator, the frequency of which is in the range of 10 kHz to 20 kHz. By changing the resistors or the capacitor, the frequency of oscillating means 106 may thereby be changed. Such substitution of components, i.e., resistors or capacitor, thereby alters the pulse frequency and duty cycle of the transmitter 12.

The signal is transmitted through an antenna 110, preferrably consisting of a suitable wire mounted on the circuit board 100. The antenna is placed in its entirety inside the enclosure 12.

The frequency of the electromagnetic field is received or detected by the relatively remote receiver 50, which incorporates within itself an inductor-capacitor tank circuit, that serves to enhance the electromagnetic field which is then directed to a field effect transistor-amplifier 52 that, in turn, communicates an amplified electromagnetic signal to the logic device 54.

A reset function is actuated by means of a momentary-action type, pushbutton switch 108 on transmitter 12. This reset function is transmitted to receiver 50 by a change in the duty cycle of the frequency specific electromagnetic pulse, with the duty cycle being changed only one cycle of the signal period for each time the reset pushbutton is actuated. This reset function cannot be reactuated for at least 500 ms after its pushbutton has been released.

By actuating the reset bushbutton 108, an alternative signal is emitted and detected by the receiver 50. This alternative signal has the effect of enabling or disabling an alarm circuit 64 in the receiver. A logic relay circuit 60 generates an internal signal that alternatively disables, sets, or resets the alarm 64, thereby permitting an allowable separation of the transmitter 12 and receiver 50 without the alarm 64 actuating.

Receiver 50 automatically enables alarm 64 through the same logic function circuit when the transmitter 12 is returned to an area proximate the receiver 50 and the pulsed signal is detected.

Logic function 106 on the transmitter can be expanded to include a rapid depression of reset pushbutton 100, which would turn off the device, thus allowing the reset pushbutton to become an on-off button.

In the second instance, a low-voltage detector 62 monitors the battery condition of the receiver card. When the low-voltage detector circuit 62 detects that the power source is low, it generates a signal and sends that signal to the alarm control circuit 60. Depending on the logic function activated, alarm mechanism 64 will actuate. The transmitter circurty operates in a identical manner to monitor a low voltage condition.

The user is alerted to a low-voltage battery condition by three beeps of the alarm. A plurality of different audible signals are provided to alert the user to system or device status: One beep for device enable, two for disable, although a wide variety of such audible feedback functions can be designed into such a system.

Alarm control circuit 60 is a relay circuit that either directly acutates an audible alarm device, such as a speaker alarm or a piezo alarm, or conversely, actuates other intermediate circuits and/or devices, as for example, a LED display or a variety of security system devices.

The present invention is a proximity sensing mechanism, such that by way of example, the receiver may be deployed within a folder of a document, and the transmitter in proximity to a file cabinet. If the folder moves out of range of the file cabinet, alarm mechanism 60 is actuated.

All functions are controllable from the transmitter, which remains on the individual and the advantage of incorporating all control within the transmitter is that, for example, the system or device may be disabled as the receiver 50 is attached to luggage which is on a conveyor belt at an airport. In situations like this one, the user cannot, could not, reach the disabling function if it were located on the luggage.

As many variations will readily occur to those skilled in the relevant art, it is understood that the above disclosure is by way of illustration and example. For instance, in high volume usage where many different transmitter/receiver optional frequencies would be necessary, the logic functions would be designed using standard semiconductors, semicustom integrated circuits or custom ICs.

Any of the above mentioned structures would contain all the logic functions needed to allow the device to perform as indicated herein. Therefore, it is understood that the limitations to said invention reside only in the claims.

What is claimed is:

1. A radio frequency proximity sensing apparatus, comprising:

a transmitting device;

said transmitting device having oscillating circuit means for the propagation of a timed, pulsed electromagnetic signal;

said transmitting device includes means for providing control functions comprising a momentary action, push-button switch and circuit means for altering the timing of the pulsed signals from said oscillating circuit in response to the actuation of said switch;

a separate receiving device;

said receiving device having means for the detection of said timed, pulsed electromagnetic signal;

said receiving device including logic means for processing said timmed, pulsed electromagnetic signal;

said receiving device including an alarm circuit such that said receiving device logic means actuates said alarm circuit when said receiving device is moved away from the proximity of said transmitting device and said detection means ceases to sense said timed, pulsed electromagnetic signal; and said receiving device including means responsive to the altered timing of said pulsed signals for controlling the operation said alarm circuit.

2. A radio frequency proximity sensing apparatus as recited in claim 1, wherein:

said receiving device is paired to said transmitting device such that as said transmitting device emits an electromagnetic signal, said receiving device processes said electromagnetic signal to said logic means such that when said electromagnetic signal is not received by said receiving device said alarm circuit is actuated.

3. A radio frequency proximity sensing apparatus as recited in claim 1, wherein:

said logic menas for processing said electromagnetic signal deactuates said alarm circuit.

4. A radio frequency proximity sensing apparatus as recited in claim 1, wherein:

said logic means for processing said electromagnetic signal resets said alarm circuit.

5. A radio frequency proximity sensing apparatus as recited in claim 1, wherein:

said receiving device alarm circuit includes a piezo device; and said piezo alarm device including means for emitting a two-tone audible signal.

6. A radio frequency proximity sensing apparatus as recited in claim 1, wherein:

said receiving device includes electronic means for the enablement of said alarm circuit; and said enablement being processed through said logic means as said receiving device is moved back into proximity with said transmitting device.

7. A radio frequency proximity sensing apparatus as recited in claim 6, wherein:

said logic means actuate a signal internal to said receiving device whereby, said alarm circuit is selectively actuated, deactuated, or reset.

8. A radio frequency proximity sensing apparatus as recited in claim 6, wherein:

said transmitting device includes a reset bushbutton disposed thereon; and logic means in said transmitting device for the actuation and deactuation of said receiving device alarm circuit upon actuation of said reset bushbutton.

9. A radio frequency proximity sensing apparatus as recited in claim 1, wherein:

said receiving device and said transmitting device each include battery means for the independent operation thereof.

10. A radio frequency proximity sensor apparatus as recited in claim 1, wherein:

said logic means selectively enables said alarm circuit in response to the momentary action push button switch being actuated, whereby a feedback signal to the user is actuated in the form of an alarm; said alarm circuit actuating siad alarm once as said transmiter is turned on; said logic means actuating said alarm circuit, said alarm circuit actuating said alarm in a series of two responses as said receiver goes out of range.

11. A radio frequency proximity sensor apparatus as recited in claim 1, including:

a low voltage battery condition; said low voltage battery condition actuating said alarm circuit such that a user is prompted thereby that a low voltage battery condition exists at that time.

12. A radio frequency proximity sensor apparatus as recited in claim 11, wherein:

said low voltage battery condition is monitored in said transmitter device and in said receiver device.

13. A radio frequency proximity sensor apparatus as recited in claim 11, wherein:

said low voltage battery condition actuates said alarm circuit as said receiver device is turned off.

14. A radio frequency proximity sensing apparatus as recited in claim 1, wherein:

said alarm circuit actuates once as said receiver is brought back into range of said transmitter.

15. A radio frequency proximity sensing apparauts as recited in claim 1, including:

means for utilizing the on-off switch as a reset switch;

said reset function enabled as said on-off switch is actuated; and when said on-off switch is held down for a time duration substantially less than two seconds.

16. A radio frequency said on-off function is actuated as said on-off switch is held down for a time duration of two or more seconds.

* * * * *

UNITED STATES PATENT AND TRADEMARK OFFICE
CERTIFICATE OF CORRECTION

PATENT NO. : 4,871,997

DATED : October 3, 1989

INVENTOR(S) : Luc W. Adriaenssens, Orlando A. Bustos and David Swanson

It is certified that error appears in the above-identified patent and that said Letters Patent is hereby corrected as shown below:

Column 5, claim 1, line 62, "timmed" should be --timed--.

Column 6, claim 8, lines 42 and 46, "bushbutton" should be --pushbutton-- in both instances.

Column 6, claim 10, line 58, "siad" should be --said--.

Column 8, line 8, after "frequency" add the following: --proximity sensing apparatus as recited in claim 15, wherein;--

Signed and Sealed this

Second Day of October, 1990

*Attest:*

HARRY F. MANBECK, JR.

*Attesting Officer*

*Commissioner of Patents and Trademarks*